United States Patent [19]
Hammond

[11] Patent Number: 5,525,251
[45] Date of Patent: Jun. 11, 1996

[54] THERMAL ENERGY STORAGE COMPOSITIONS TO PROVIDE HEATING AND COOLING CAPABILITIES

[75] Inventor: Michael J. Hammond, Indianapolis, Ind.

[73] Assignee: Store Heat and Produce Energy, Inc., Indianapolis, Ind.

[21] Appl. No.: 484,377

[22] Filed: Jun. 7, 1995

Related U.S. Application Data

[63] Continuation-in-part of Ser. No. 342,112, Nov. 18, 1994.

[51] Int. Cl.$^6$ ............................................. C09K 5/06
[52] U.S. Cl. .......................... 252/70; 252/71; 252/73; 62/71; 62/347
[58] Field of Search .................... 252/70, 71, 73; 62/71, 347

[56] References Cited

U.S. PATENT DOCUMENTS

| | | | |
|---|---|---|---|
| 3,986,969 | 10/1976 | Telkes | 252/70 |
| 4,100,092 | 7/1978 | Spauschus et al. | 252/70 |
| 4,189,394 | 2/1980 | Schröder et al. | 252/70 |
| 4,303,541 | 12/1981 | Wasel-Nielen et al. | 252/70 |
| 4,332,690 | 6/1982 | Kimura et al. | 252/70 |
| 4,392,971 | 7/1983 | Kimura et al. | 252/70 |
| 4,397,752 | 8/1983 | Kimura et al. | 252/70 |
| 4,431,558 | 2/1984 | Wada et al. | 252/70 |
| 4,447,347 | 5/1984 | Goldfarb et al. | 252/70 |
| 4,465,611 | 8/1984 | Yanadori et al. | 252/70 |
| 4,491,529 | 1/1985 | Piel et al. | 252/70 |
| 4,509,344 | 4/1985 | Ludwigsen et al. | 62/76 |
| 4,540,502 | 9/1985 | Kimura | 252/70 |
| 4,585,573 | 4/1986 | Yanadori et al. | 252/70 |
| 4,645,612 | 2/1987 | della Faille d'Huysse et al. | 252/70 |
| 4,671,077 | 6/1987 | Paradis | 62/324.1 |
| 4,978,469 | 12/1990 | Seaman, Jr. | 252/70 |
| 5,037,571 | 8/1991 | Ames | 52/70 |
| 5,402,650 | 4/1995 | Stewart, Jr. | 62/71 |

OTHER PUBLICATIONS

YORK IceBalls™ Thermal Storage System product information brochure (Form 175.03 G1 (191)). no date.
"Heating With Ice Storage—A Case Study", by J. Gregory Reardon, pp. 16–1–16–11. no month.

Primary Examiner—Melissa Bonner
Attorney, Agent, or Firm—Barnes & Thornburg

[57] ABSTRACT

The present invention relates to a thermal energy storage composition and a method for reducing rupture failures during freezing cycles of container devices holding aqueous phase change materials. The thermal energy storage composition of the present invention contains about 60 to about 96.5 weight percent water, about 3 to about 40 weight percent of one or a mixture of water-dispersible non-ionic surfactants, particularly alcohol ethoxylates, and preferably an anionic surfactant in an amount sufficient to reduce phase separation of the composition at elevated temperatures.

21 Claims, 8 Drawing Sheets

THERMAL ENERGY STORAGE COMPOSITIONS TO PROVIDE HEATING AND COOLING CAPABILITIES

CROSS-REFERENCE TO RELATED APPLICATIONS

This application is a continuation-in-part of U.S. application Ser. No. 08/342,112, filed Nov. 18, 1994.

FIELD OF THE INVENTION

The present invention relates to thermal energy storage compositions. More particularly, the present invention relates to an improved water-based thermal energy storage composition formulated to contain additives effective to disrupt ice structure formation and reduce the volume expansion associated with freezing and effective to reduce phase separation at elevated temperatures.

BACKGROUND AND SUMMARY OF THE INVENTION

Phase change materials ("PCMs"), also known as thermal energy storage compositions, store heat during phase transition, typically liquid/solid phase transitions. A large amount of thermal energy can be stored as latent heat of fusion during the melting of the PCM. For this reason, PCMs are often incorporated into thermal energy storage and heat exchanger apparatuses. During the operation of such an apparatus, heat from the surrounding air is transferred to the PCM as heat of transition, until the frozen PCM completely melts. Additional heat from the surrounding air can then be stored within the PCM as sensible heat. The heat stored within the PCM may be discharged from the apparatus by passing relatively cool air past the liquid PCM. The liquid PCM transfers its heat to the air stream, and thus, the temperature of the air stream is raised and the PCM is re-cooled.

Various attempts have been made to incorporate PCMs into heating and air conditioning systems, including heat pump systems, solar collection systems, and more conventional heating and air conditioning systems for homes, vehicles, and similar structures requiring heating and cooling. For example, U.S. Pat. No. 5,054,540 to Carr describes a cool storage reservoir positioned in an air duct of a vehicle or the like. Another example is the "heat battery" designed to provide "instant heating" to a vehicle cabin. (Automotive Engineering, Vol. 100, No. 2, February, 1992.)

A variety of materials may be used as PCMs. For example, water, paraffins, alcohols, and salt hydrates have notably high energy densities over temperature ranges of practical significance. Water, however, is of particular interest because it is plentiful, inexpensive, and environmentally friendly. As a heat storage material, it has good heat capacity, heat transfer properties, and an acceptable density. Additionally, the transformation of the water into ice has a heat of fusion of 80 cal/g, and it occurs at 0° C.

However, the use of water as a PCM presents some difficulties. For example, conventional air conditioning units must be reconfigured to operate at the ice temperature, and, in an air heat exchanger, moisture can freeze on the cooling coil. Other problems derive from the fact that the freezing of water to ice is accompanied by approximately a 9% volume expansion. This anomalous expansion during freezing is the cause of burst water pipes in homes during cold weather, and cracked radiators/engine blocks in cars. What is needed is an aqueous PCM, which has the energy storage qualities of water but lacks the destructive freeze characteristics associated with water's transformation to ice.

According to the present invention, there is provided a method for reducing rupture failures during freezing cycles of a heat exchange/storage device utilizing an aqueous PCM composition by adding to the aqueous PCM composition a freeze-modifier comprising an non-ionic surfactant, preferably alcohol ethoxylates, and an anionic surfactant in an amount effective to stabilize, i.e. to reduce phase separation of, the composition at elevated temperatures.

Also in accordance with the present invention there is provided a water-based thermal energy storage composition capable of forming a discontinuous ice phase and of significantly maintaining the energy storage properties of water. The composition comprises about 60 to about 96.5 weight percent water, about 3.0 to about 40 weight percent of one or a mixture of water-dispersible non-ionic surfactants and an anionic surfactant in an amount sufficient to stabilize the composition at elevated temperatures.

An objective of the present invention is to modify the freeze characteristics of water, specifically the single piece characteristic of ice while significantly maintaining the energy storage capacity and freezing point of the water. With use of this invention ice forms as discrete particles, forming a kind of "slippery ice" with concomitant reduction of the volume expansion accompanying ice formation. Further, the composition in accordance with the present invention prevents the formation of a single, solid, block of ice and reduces freeze expansion.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE INVENTION

In accordance with the present invention there is provided a method for reducing rupture failures during the freezing of heat exchange/storage devices utilizing water-based phase change materials. It has been found that when a non-ionic surfactant, preferably one or a mixture of alcohol ethoxylates, is used in combination with water, the composition is capable of forming a discontinuous ice phase while maintaining the energy storage properties and freezing point of the water. In addition, volume expansion which accompanies the water to ice transformation is reduced with little if any depression in the freezing point.

The presence of non-ionic surfactant in water subjected to subfreezing temperatures changes the physical characteristics of the resulting frozen mass. Water, in the absence of a non-ionic surfactant, expands as it freezes and forms as a solid ice block. Additionally, the water solidifies from the outside of the water mass toward the center core. Thus, when the center core freezes, it expands as it pushes against the already solid ice block surrounding the freezing core. The direction of the expansion depends upon the strength of the surroundings and will follow the path of least resistance. Thus, even when there is available headspace above water in a container device, for example, the forces associated with expansion of the freezing liquid can readily break the container walls.

Figure 1:
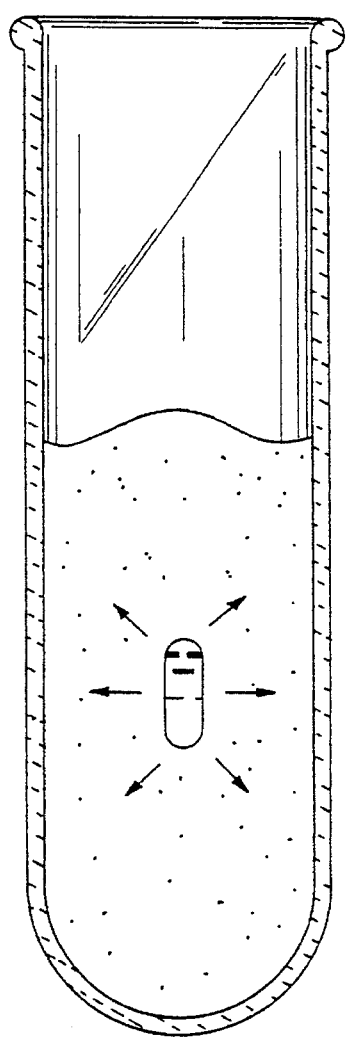
FIG. 1 is a view of a test tube holding an aqueous phase change material that includes a non-ionic surfactant and showing a freezing center core pressing discrete ice particles up through an already frozen surface into available space above said surface.

It has been found that when non-ionic surfactants are added to a water-based phase change material (PCM), a discontinuous ice phase is formed in which forces/pressures are reduced by movement of individual ice particles throughout the frozen mass. A somewhat "slippery" ice is formed. This "slippery" ice is believed to consist of discrete ice particles surrounded by a layer of solidified hydrated surfactant phase. The particles do not interlock, but can move individually responsive to localized pressure within the solidified mass. As the center core of the surfactant modified PCM freezes, forces from the resultant expansion cause the surrounding particles to individually move away from the freezing core. If there is available head space above the surface of the PCM, the discrete ice particles in the discontinuous ice phase will be forced into that available space, see FIG. 1. Thus, the resulting frozen PCM often presents a domed surface. The discrete ice crystal mobility in the present water based PCMs allows them to be frozen in a wide variety of inflexible commercially available containers without breakage, provided that there is available head space to accommodate the resultant expansion of the PCM.

Therefore, there is also provided, as another embodiment of the present invention, a thermal energy storage composition comprising about 60 to about 96.5 weight percent water, about 3 to about 40 weight percent of one or a mixture of non-ionic surfactants, and about 0.3 to about 1.0 weight percent anionic surfactant. The present compositions differ from present commercially available water-based PCM's particularly in that they utilize a non-ionic surfactant in addition to standard art-accepted anionic surfactants. The anionic surfactant adds heat stability to, i.e. reduces phase separation of, the energy storage composition solution at elevated temperatures during sensible heat storage. The water-based thermal energy storage compositions of the present invention can also include other optional ingredients such as defoamers and microbiocides to aid in formulation of the composition and to enhance customer acceptance of the product.

A suitable non-ionic surfactant for use in this invention is selected from one or a mixture of non-ionic surfactants. Non-ionic surfactants which may be formulated into the present invention include commercially available alcohol ethoxylates, including alkyl phenolalkoxylates, polyoxyethylene derivatives of sorbitan fatty acid esters of lauric acid, palmitic acid, oleic acid, and stearic acid, block copolymers of propylene and ethylene oxides, glycerol fatty esters, polyoxyethylene esters and polyoxyethylene fatty acid amides. Typically, the composition includes water-dispersible, short chain, low molecular weight linear alcohol ethoxylates. Preferably, the alcohol ethoxylates are represented by the general formula R—O—$(CH_2CH_2O)_n$H where R is an alkyl radical having from 8 to about 16 carbon atoms and the number of ethoxylate groups, n, average from about 5 to about 8. Typical ethoxylate compositions comprise a mixture of a linear paraffin containing 8–16 carbon atoms and an average of about 5 to about 8 ethoxy groups. Most preferably, the ethoxylate mixtures comprise $C_{10}$–$C_{12}$ alcohol ethoxylates having an average of about 5 ethoxy groups attached. Commercially available non-ionic surfactants of this type are sold by Vista Chemical Company under the trade name Alfonic surfactants, with Alfonic 1012-5 being preferred for use herein. It is contemplated, however, that alcohol ethoxylates such as octylphenolethoxylates and nonylphenolethoxylates may be used herein.

The non-ionic surfactant is present in the composition from about 3 to about 40 weight present. Preferred weight percentages of the non-ionic surfactants are dependent upon the preferred characteristics of the thermal energy storage composition. To maximize the ability of the energy storage composition to maintain the energy storage capability of water, the composition typically includes from about 3 to about 30 weight percent non-ionic surfactants. The preferred thermal energy storage composition for use in accordance with the present invention includes about 4.4 weight percent non-ionic surfactants.

The water-based thermal energy storage composition further includes an anionic surfactant present in the solution from about 0.3 weight percent to about 1.0 weight percent. It is noted that surfactants have minimal affect on sensible heat storage of the composition. In fact, for every 10 weight percent of surfactant, there is only a corresponding decrease in sensible heat storage capacity of about 5 percent. Therefore, the preferred water-based thermal energy storage composition includes about 0.5 weight percentage anionic surfactant.

The anionic surfactants are preferably included in the thermal energy storage compositions of the present invention to prevent separation of the non-ionic surfactant and the water into organic and water phases at increased temperatures. The temperature of the PCM often rises to increased temperatures as it stores sensible heat. Without an anionic surfactant, separation of the layers occurs at about 35° C. to about 40° C., the cloud point of the solution. The addition of the anionic surfactant stabilizes, i.e. reduces the amount of phase separation of, the thermal energy storage composition and causes it to be in a continuous single phase when heated to approximately 90° C. Heat stability is often important for customer acceptance of the product when it is to be used to store sensible heat, because once the phases have separated into distinct layers, it is difficult and often impractical to re-mix them. For example, if the thermal energy storage composition were used in a vehicular application, it would likely be subjected to extreme heating conditions, well-above 35° C. to 45° C. Moreover, if the surfactant and water were to separate into layers, the agitation from driving along a highway would likely be insufficient to force the phases back into a single solution.

A wide variety of anionic surfactants suitable for use in the present invention include naphthalene sulfonates, sodium stearates, salts of a fatty acid, and surfactants having the formula R—COOM and R—OSO$_3$M, where M represents an alkali metal or ammonium and R represents an organic radical having more than 10 carbon atoms. Examples of suitable anionic surfactants are soaps, sodium lauryl sulfonate, alkyl naphthalene sulfonates, and sodium stearate. Preferably, the anionic surfactant is an alkyl naphthalene sulfonate. Commercially available anionic surfactants of this type are sold by Witco, Inc., under the trade name Petro surfactants, with Petro ULF being a preferred alkyl naphthalene sulfonate for use herein., Petro ULF is an aqueous solution of a modified sodium alkyl naphthalene sulfonate. The solution contains 50 wt. % solids and has a specific gravity of 1.2.

EXAMPLE 1

A water-based PCM was formulated in accordance with the present invention to include 10 weight percent non-ionic surfactant. The surfactant, Alfonic 1216CO-7.5 was added and dissolved in warm water. Warm water was preferred as it facilitated the dissolution of the ethoxylate. After the ethoxylate surfactant was solubilized, about 1 weight percent of Petro ULF (2 volume percent active), was added as a elevated temperature stabilizer.

Figure 2:
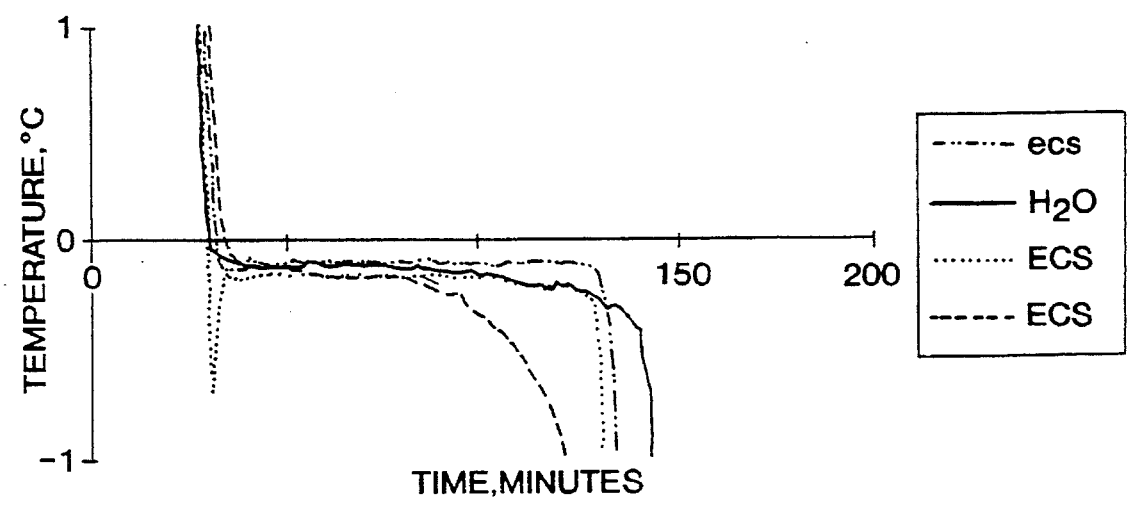
FIG. 2 is a plot of temperature versus time showing performance of a PCM in accordance with the present invention comprising 10 weight percent alcohol ethoxylates having a alkyl chain of 12 to 16 carbon atoms and an average of about 7.5 ethoxylate groups, 1 weight percent anionic surfactant, and 89 weight percent water in accordance with the present invention.

The freeze characteristics of this water-based PCM solution are plotted in FIG. 2. As can be seen in the graph, the freeze temperature of the PCM composition in accordance with the present invention was essentially the same as that for water. Additionally, the freeze "plateau", indicative of the energy storage capabilities of the material, was similar to that of water. The time to freeze the PCM, however, was less than the time to freeze the equivalent weight of water. Unlike a salt-water system (see FIG. 3), freezing point depression and "tailing" at the end of the freeze were not observed. Significant freezing point depression and "tailing" are indicative of an unacceptable PCM composition for purposes of the present invention.

Figure 6:
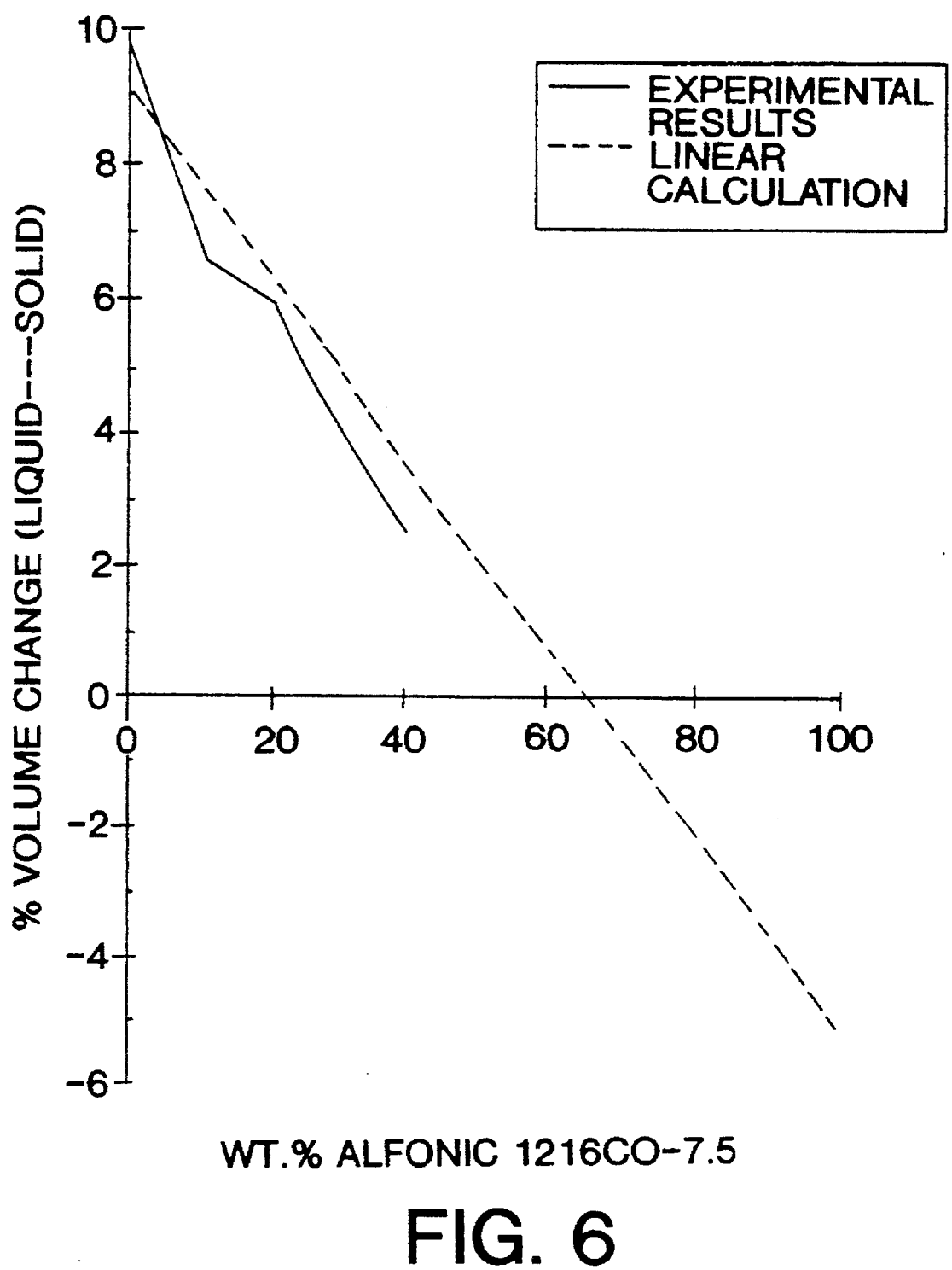
FIG. 6 is a plot of the freeze expansion versus weight percentage of $C_{12}$–$C_{16}$ alcohol ethoxylates having an average of about 7.5 ethoxylate groups in a water-based PCM showing a decrease in freeze expansion as the weight percentage ethoxylates in the composition increases.
Figure 7:
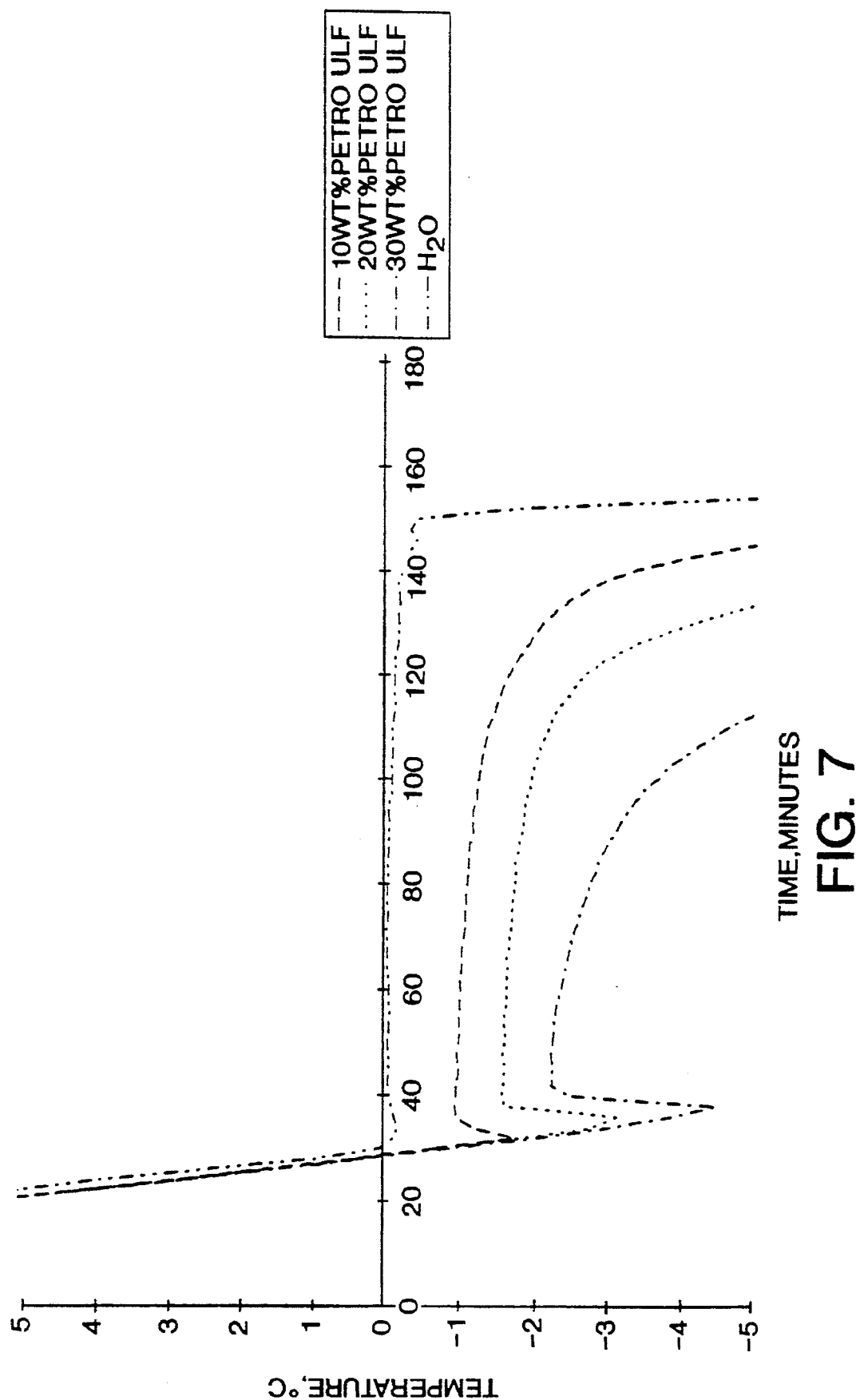
FIG. 7 is a plot of temperature versus time showing performance of water-based composition containing various weight percentages of an alkyl naphthalene sulfonate anionic surfactant.

The Alfonic 1216CO-7.5/water system, when subjected to a freeze-thaw cycle formed a gelatinous layer on the surface, but no further evidence of segregation could be observed within the sample. As can be seen in FIG. 6, the freeze expansion of this system was measurably less than for pure water.

EXAMPLE 2

A water-based PCM was formulated to include 3 weight percent surfactant. The surfactant, Alfonic 1012-5, was dissolved with about 1 weight percent Petro ULF (about 2 volume percent active) in water and tested for cloud point. The cloud point of the solution was above 90° C. Upon 6 consecutive freeze-thaw cycles, segregation of the components was minimal. The composition successfully disrupted the ice structure of water during a freeze.

EXAMPLE 3

Test solutions of PCMs were prepared in accordance with the protocol of Example 1 to evaluate the freezing point and the resulting freeze curve of the compositions.

| Compound(s) Added to Water | Weight % of Compound in PCM | Water Solubility | Freezing Point °C. Relative to Water | Freeze Curve See FIGURE |
|---|---|---|---|---|
| polyethylene glycol –300 (CW300) | 5% | yes | slight dep. | 3 |
|  | 10% | yes | –1 | — |
|  | 20% | yes | –3 | — |
| MgCl$_2$.6H$_2$O | 9% | yes | –3—4 | 3 |
| Alcohol ethoxylate R—O(CH$_2$CH$_2$O)$_n$H |  |  |  |  |
| R = C$_{12}$–C$_{16}$ alkyl n = 2 | 5% | no | slight dep. | 3 |
|  | 20% | no | 0 | — |
| R = C$_{10}$–C$_{12}$ alkyl n = 5 | 10% | yes | 0 | — |
|  | 20% | yes | slight dep. | — |
|  | 30% | yes | –1 | 4 |
| R = C$_8$–C$_{10}$ alkyl n = 7–8 (Novel II 810-7.5) | 30% | — | –0.7 | 4 |
| R = 12–16 alkyl n = 7 (Novel II 1216-7) | 30% | — | –0.1 | 4 |
| R = C$_{12}$–C$_{16}$ alkyl n = 7.5 | 10% | yes | 0 | 5 |
|  | 20% | yes | slight dep. | 5 |
|  | 30% | yes | slight dep. | 5 |
|  | 40% | yes (gel) | –1.4 | 7 |

Figure 3:
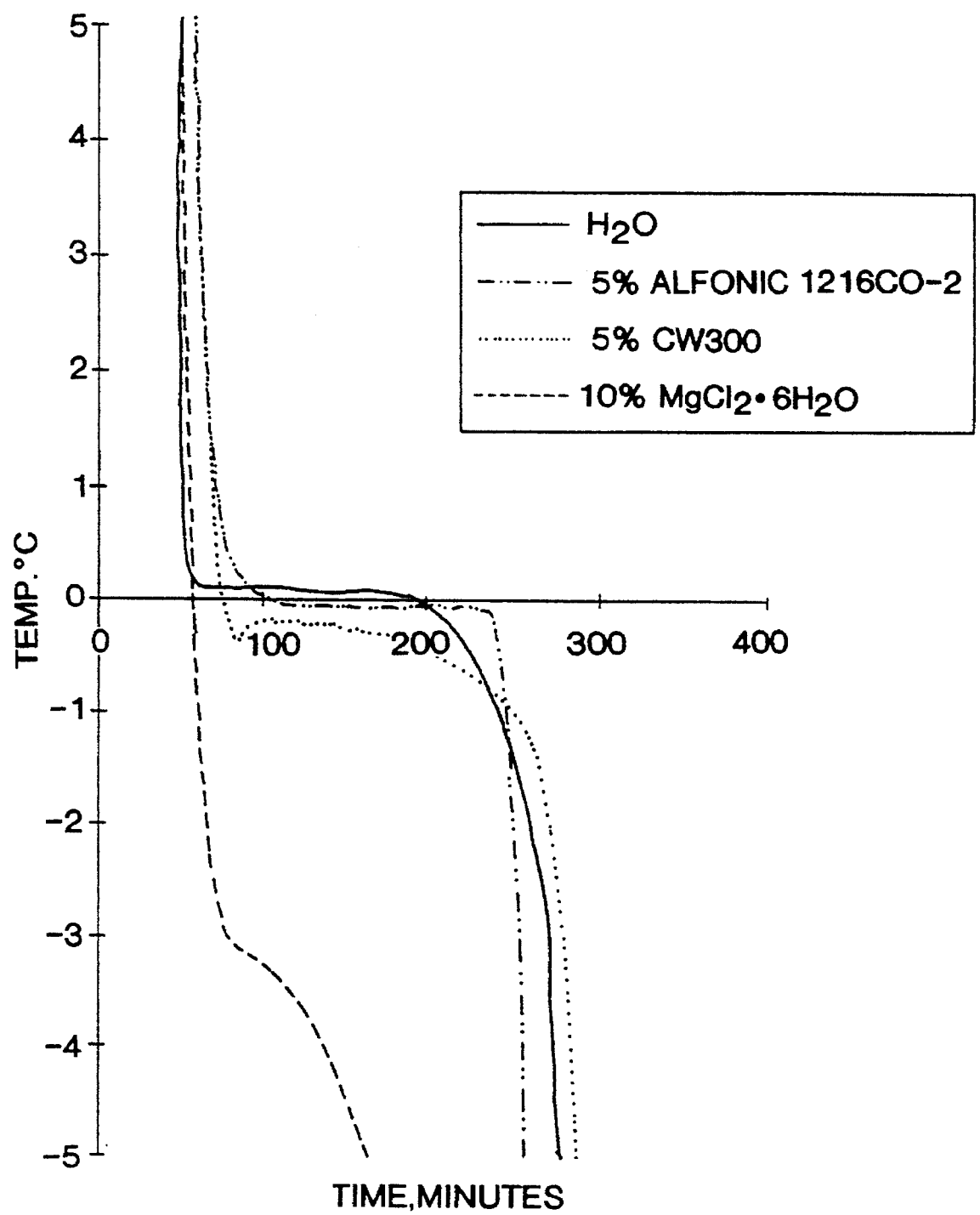
FIG. 3 is a plot of temperature versus time of a $MgCl_2 \cdot 6H_2O$/water solution, polyethylene glycol/water solution, and a water-based PCM composition comprising a mixture of 5 weight percent $C_{12}$–$C_{16}$ alcohol ethoxylates having an average of about 2 ethoxy groups.

The freeze curve of the polyethylene glycol (PEG), MgCl$_2$.6H$_2$O, and Alfonic 1216CO-2 are illustrated in FIG. 3. Each of these compounds were dismissed as unworkable as a PCM, in accordance with the present invention. High levels of PEG would be necessary for adequate suppression of freeze expansion. At the same time, increasing levels of PEG caused intolerable depression of the freezing point. Secondly, the MgCl$_2$.6H$_2$O, depressed the freezing point to –3° to –4° C. which often exceeds the minimal default requirements for an air-conditioning system to generate the required amount of ice in the allotted time slot. Also, the use of chloride salts are bad from a corrosion standpoint in metal containers. Finally, the C$_{12}$–C$_{16}$ alcohol ethoxylate having 2 ethoxy groups is regarded as a surfactant precursor and is not soluble in water. The freeze tests demonstrated virtually no interaction with water.

Figure 4:
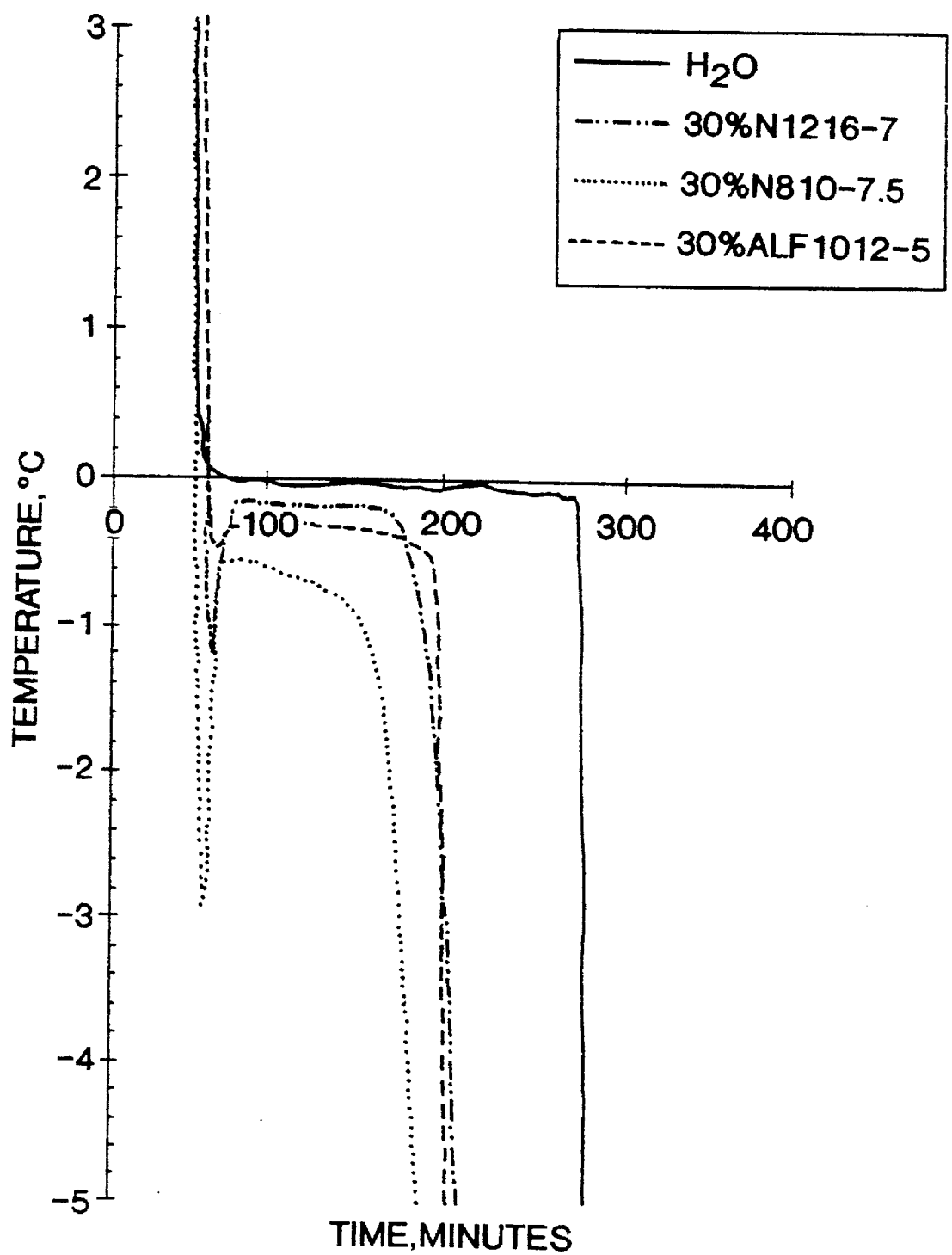
FIG. 4 is a plot of temperature versus time showing three water-based PCMs comprising 30 weight percent alcohol ethoxylates, each of the three ethoxylates having a different mixture of alkyl radicals and numbers of ethoxylate groups present in the composition.

As illustrated in the plot of FIG. 4, three ethoxylate/water solutions were tested against a 100% water standard. High purity alcohol ethoxylates are sold by Vista under the trade name Novel II surfactants, with Novel II 810-7.5 and Novel II 1216-7 being plotted in FIG. 6. The Novel II 810-7.5 exhibited more freeze depression than the Novel II 1216-7 and Alfonic 1012-5. However, note, the initial dip in temperature for each of the compounds was attributed to supercooling, and was not relative to the freeze depression of the system. Both the Novel II 1216-7 and Alfonic 1012-5 exhibited acceptable freeze plateaus, similar to water with minimal depression in freezing point.

Figure 5:
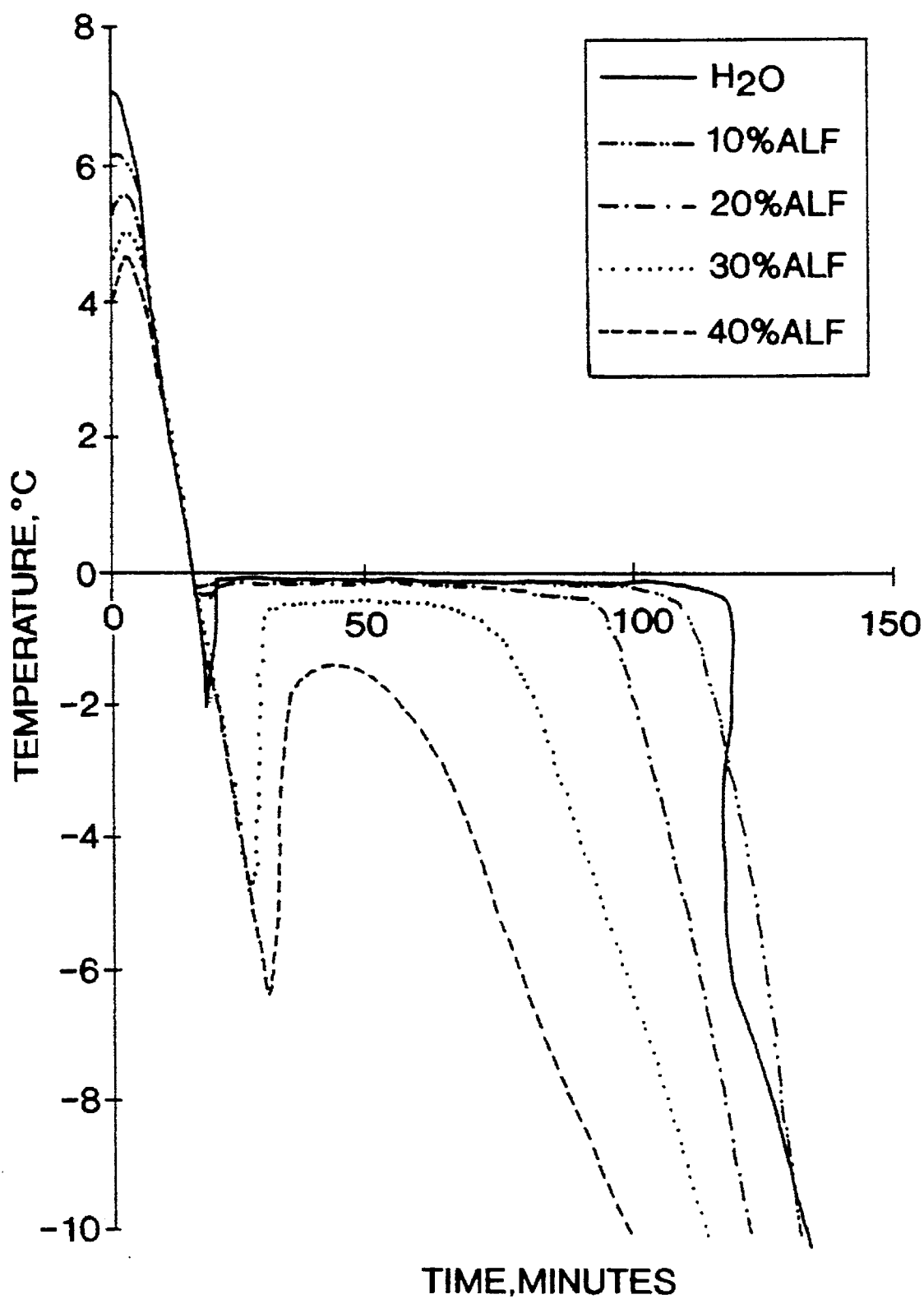
FIG. 5 is a plot of temperature versus time showing a water-based PCM having various weight percentages of $C_{12}$–$C_{16}$ alcohol ethoxylates having an average of about 7.5 ethoxylate groups in accordance with the present invention.

As illustrated in FIG. 5, Alfonic 1216CO-7.5 water solutions were tested at a variety of weight percentages. Note, the energy storage properties of the solution were best when the freezing curve plateau mimics that of water. As shown, the 10% Alfonic demonstrated a freeze plateau closest to water of the four samples with no detectable depression in the freezing point. In fact, the freezing point of water is slightly, if at all, affected up to 30 weight percent of ethoxylate.

EXAMPLE 4

To determine the freeze/thaw and heat stability of the Alfonic 1216CO-7.5, the solutions of Example 1 were subjected to freezing and subsequent thawing. After the thaw, only slight segregation was observed. Additionally cycle testing through four freeze-thaw cycles with no agitation between cycles and room temperature as an upper temperature limit, failed to reveal any changes in the freeze characteristics of the composition.

At elevated temperatures, turbidity was observed in the ethoxylate/water solution which indicated some phase separation. However, the addition of Petro ULF anionic surfactant stabilized the micelles, and when heated to 90° C., and only slightly turbidity was observed. Upon cooling, only a single phase system was visually observed.

EXAMPLE 5

To determine the effect of an anionic surfactant on the heat stability of the PCM, a 30 weight percent solution of Alfonic 1216CO-7.5 in water was prepared using warm water. Ivory soap, manufactured by Proctor & Gamble, was added in the amount of 0.5 g per 100 g of surfactant solution. When heated to 90° C., very slight phase separation occurred, but upon cooling, only a single clear solution was observed. Thus, the presence of the anionic surfactant prevented coalescence at elevated temperatures.

EXAMPLE 6

To observe volume expansion associated with freezing water, 100 g of water are placed in a 125 ml Erlenmeyer flask (slight conical shape) and placed in a freezer. Upon freezing, the flask broke. This test was repeated 10 times, and each time the expansion of the ice broke the Erlenmeyer flask. However, when ethoxylate/water solutions were frozen under the same or similar conditions, the Erlenmeyer flasks did not break, as demonstrated in Examples 7–9.

EXAMPLE 7

To compare the forces associated with the volume expansion of freezing water with those of an alcohol ethoxylate/water solution, three 125 ml Erlenmeyer flasks were filled to contain 100± 0.2 g of water. A fourth Erlenmeyer flask contained 100 g of a 20 weight percent Alfonic 1216CO-7.5 in water which included 0.5 g of sodium stearate. The flasks were allowed to freeze overnight in a freezer. In the morning, each of the three flasks containing water were broken. The flask containing the surfactant solution did not break and the solution pushed the surface up into the available head space and formed a slight dome shaped surface.

EXAMPLE 8

To again compare the behavior of freezing alcohol ethoxylate/water solution with that of water, 100 g of water was added to a 125 ml Erlenmeyer flask. Three other flasks each contained 100 g of a 10 weight percent Alfonic 1216CO-7.5 solution. The four flasks were placed in a freezer at −23° C. and allowed to freeze. Upon removal, only the flask containing the water was broken. Each of the flasks containing the surfactant/water solution pushed up through the surface into the available head space in the flask. The frozen mass included a slight domed surface.

EXAMPLE 9

In order to demonstrate the physical differences between ice and frozen water-surfactant solutions, 1 kg of water was added to a bread pan, measuring 5×9 inches and 2.5 inches high. A 1 kg solution containing 10 weight percent Alfonic 1216CO-7.5, 1 weight percent Petro ULF, and 89 weight percent water was added to a second bread pan. Both pans were placed in a freezer overnight. A small fan was also placed in the freezer to ensure a complete freeze of the materials. The next morning, a hammer was used in an attempt to drive a nail into the solid ice block. The ice immediately shattered as expected. However, the nail was successfully driven into the alcohol ethoxylate/water system without difficulty. The 1 kg mass was picked up using the nail only, demonstrating that the nail was firmly embedded in the mass. This indicated that the frozen surfactant/water system had properties substantially different than those of pure ice.

The frozen alcohol ethoxylate/water system is believed to have a discontinuous water phase rather than a continuous particulate phase as seen with water. The melted PCM has a micellar structure of surfactant in water. While one does not wish to be held to any one theory, it is believed that the act of freezing causes phase inversion. Thus, once frozen, the alcohol ethoxylate/water system, in essence, becomes solid ice particles dispersed in the organic phase. So, Erlenmeyer flasks don't break and nails can be driven into the solid mass without fracturing the mass.

EXAMPLE 10

Tests were conducted to determine the volume expansion, during freezing of the alcohol ethoxylate/water solution. All measurements were made using test tubes which measured 15 cm high and had an internal diameter of 2.2 cm. To make the measurements, stock solutions of the Alfonic 1216CO-7.5/water were prepared by adding the appropriate amount of surfactant to warm water according to the protocol of Example 1. After thorough mixing with a magnetic stirrer, the solutions were stoppered and allowed to cool. After cooling, a 30 g aliquot of each solution was placed in a respective test tube, and 5 ml of a hydrocarbon solvent was carefully added to the top of each solution.

Once the hydrocarbon was added, care was exercised so that the hydrocarbon would not become dispersed in the alcohol ethoxylate/water solution. The height (proportional to volume), in cm, for both the solution and the hydrocarbon, was measured after thoroughly cooling the contents in an ice bath. Then, the test tubes were carefully transferred to a freezer, and, with a thermocouple inserted, cooled to −5° C. to −10° C. When the desired temperature was reached, the height of the hydrocarbon liquid was again measured. The frozen solid produced an indeterminate height for measurement. The difference in the height of the hydrocarbon meniscus, Δh, before and after freezing, was attributed to volume changes in the material being tested. To calculate the percent change in volume due to freezing the expression, $(H_1+\Delta h/H_1) \times 100 - 100$ was used, where $H_1$ is the height of the meniscus of the test liquid at 0° C., and $\Delta h$ is the difference in height of the hydrocarbon meniscus before and after freezing.

For each solution, the volume change measurement was made six times, and from these six measurements, both the mean and the standard deviation were calculated. For outlying values, the statistical 2.5d rule was used to include or exclude individual data points. The results are summarized below.

| SOLUTION COMPOSITION | NO. TEST RESULTS USED | % EXPANSION DUE TO FREEZE | STD. DEVIATION |
|---|---|---|---|
| Water | 4 | 9.6 | ±0.4 |
| 10% ALFONIC | 5 | 6.7 | 0.5 |
| 20% ALFONIC | 5 | 5.9 | 0.5 |
| 30% ALFONIC | 5 | 4.0 | 0.3 |
| 40% ALFONIC | 5 | 2.5 | 0.3 |
| 100% ALFONIC | 2 | −5.1 | — |

FREEZE VOLUME EXPANSION IN THE $H_2O$-ALFONIC 1216CO-7.5 SYSTEM

The above data is plotted in FIG. 6. Also plotted is a calculated value for volume expansion in a mixed system assuming no interactions. Although this assumption is not valid, the calculated line and the experimental data show a reasonable fit. The calculated line is from the expression:

% volume expansion (freeze) = {1.09*(wt. % water)+0.949(wt. % Alfonic 1216CO-7.5)} −100

*The value, 1.09 for water, is a well known and accepted literature value.

EXAMPLE 11

A water-based PCM was formulated to include 5 weight percent of a freeze-modifier composition in water and tested for cloud point. The freeze-modifier composition included about 80 weight percent Alfonic 1012-5 and about 20 weight percent Petro ULF. The cloud point of the solution was above 90° C. Upon 80 freeze-thaw cycles, segregation of the components was minimal. Moreover, the composition successfully disrupted the ice structure of water during a freeze.

EXAMPLE 12

Three PCM solutions were prepared for elevated temperature evaluation. The composition of the solutions, the cloud points, and the phase separation temperatures are listed as follows:

ELEVATED TEMPERATURE EVALUATION OF SURFACTANT-WATER COMPOSITIONS

| Composition Number | Vol. % Water | Vol. % Alfonic 1012-5 | Vol. % Petro ULF | Cloud Point Temp., °C. | Phase Separation Temp., °C. |
|---|---|---|---|---|---|
| 1 | 94.5 | 5 | 0.5 | 58 | 89 |
| 2 | 94.5 | 4.5 | 1 | 61 | 92 |
| 3 | 94.5 | 4 | 1.5 | 64 | 95 |

NOTE 1:
All solutions at 85° C. for 16 hours - phase separation
NOTE 2:
All solutions when cooled from above Cloud Point show some phase separation when cooling. However, this clouding is temporary and continued cooling results in a clear single phase solution.

As can be seen, all of the energy storage compositions exhibit phase separation temperature which exceed the nominal elevated temperature of the thermal storage apparatus, 82° C. To provide a margin of safety in both composition and elevated temperature stability, composition number 2, containing 1 vol. % of Petro ULF was selected for further testing, as described below. It is likely that performance differences between the three compositions are negligible.

EXAMPLE 13

Figure 8:
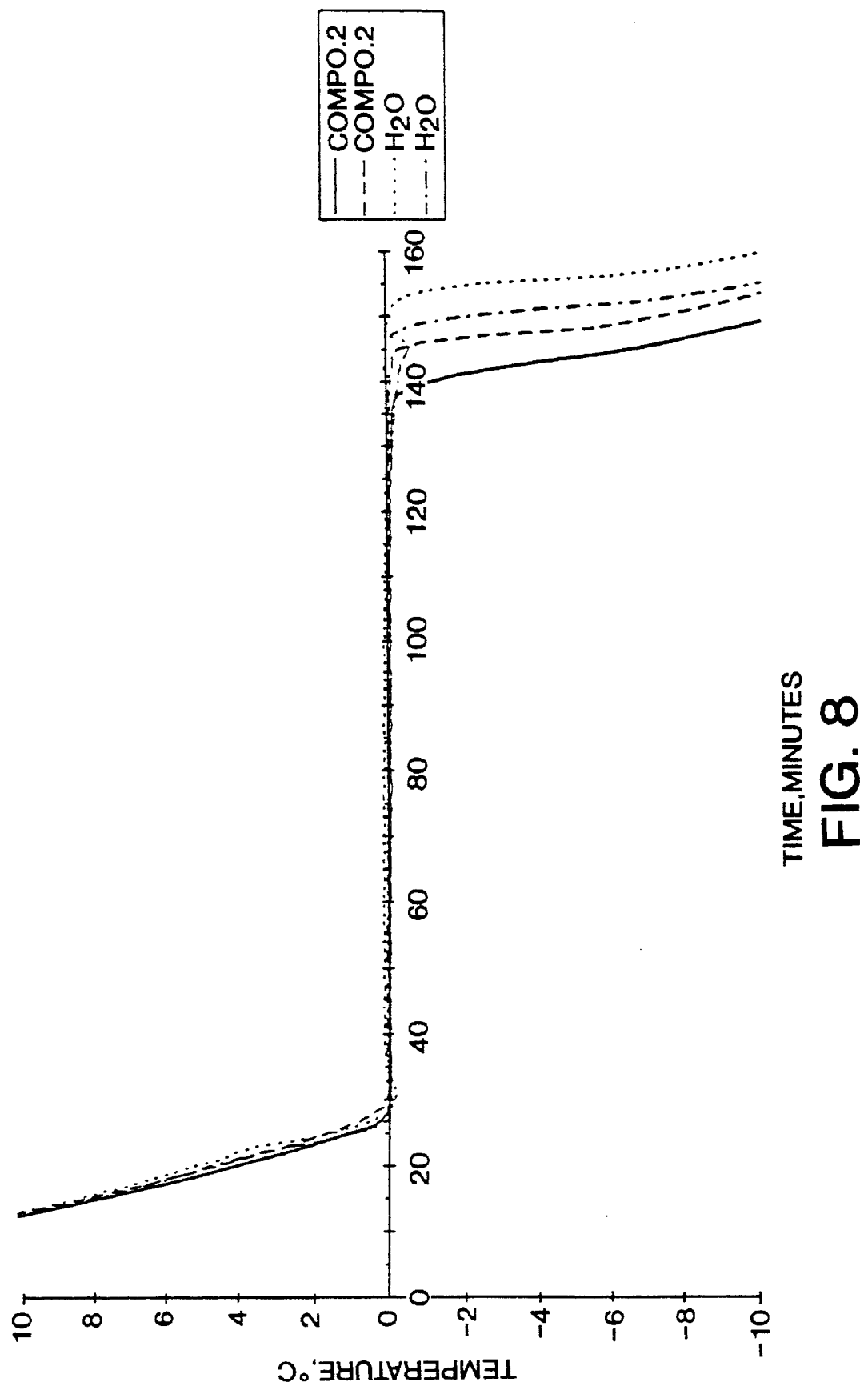
FIG. 8 is a plot of temperature versus time showing a water-based PCM having about 4.4 weight percentage of $C_{10}$–$C_{12}$ alcohol ethoxylates having an average of about 5 ethoxylate groups and 0.6 weight percentage of an alkyl naphthalene sulfonate.

Test solutions of PCMs (Composition 2 from Example 12) were prepared to evaluate the resulting freezing curve. Composition 2 corresponds to a PCM containing 94.4 wt. % $H_2O$, 4.37 wt. % Alfonic 1012-5, and 1.21 wt. % Petro ULF having 50 weight percent solids in accordance with the present invention. Samples consisted of 30 grams in a six inch test tube. The freeze curve for Composition 2 is illustrated in FIG. 8. Duplicate freeze curves for water are also shown in that Figure. The data in FIG. 8, showing similar freeze "plateaus" between the PCM and water, with minimal freeze depression indicates that the PCM has freeze characteristics and thus energy storage properties very similar to those of water. The freeze time appears to only be slightly reduced, approximately in ratio to the wt. % surfactant present.

Figure 9:
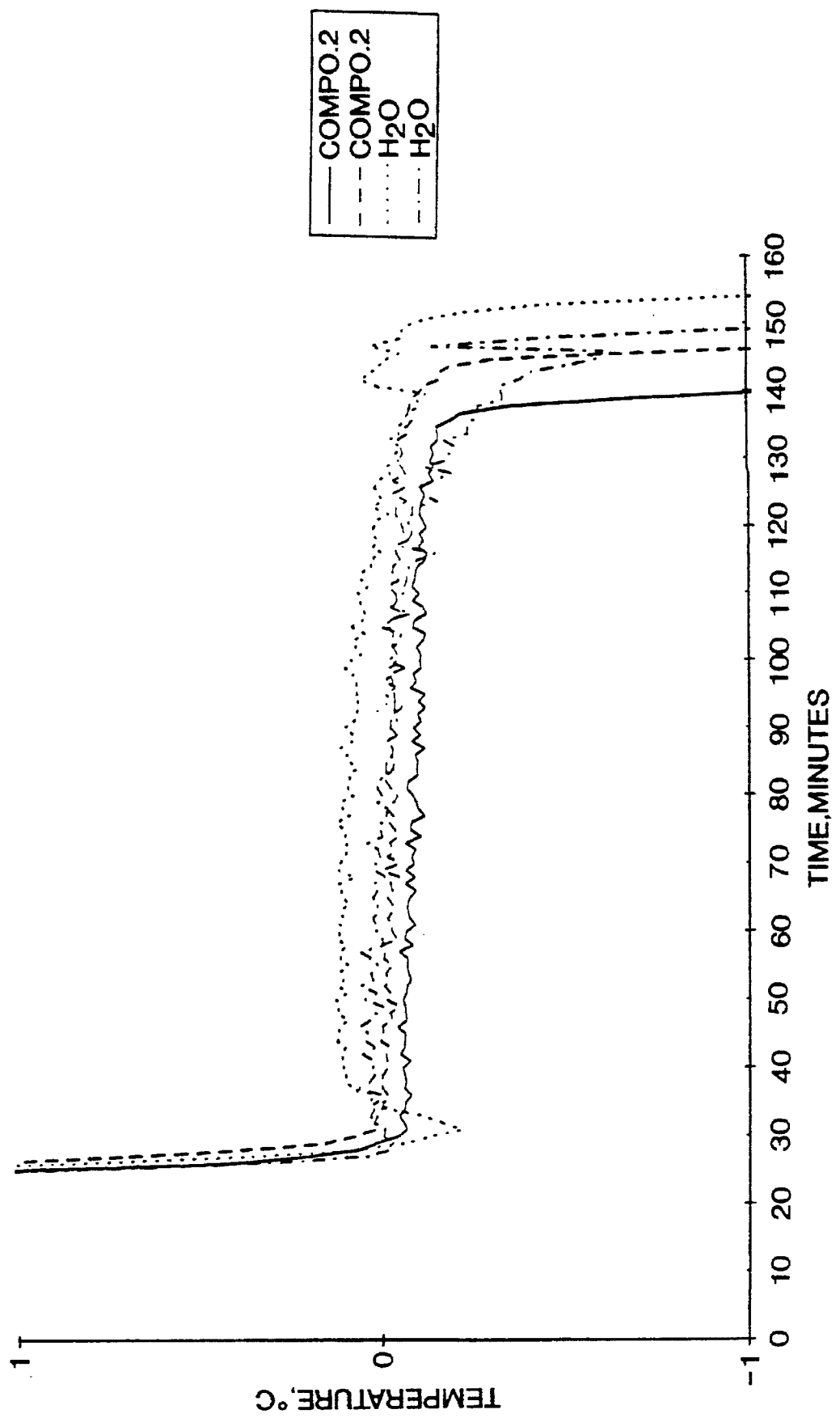
FIG. 9 is an expanded scale print of the plot of FIG. 8 showing exotherms following the apparent freezing of the water.

FIG. 9 is an expanded scale print of FIG. 8. Note that at the end of the freeze curves of water, exotherms are depicted after all the water has apparently frozen. In both of these results, the test tubes broke during the freeze process. It is believed that, near the end of the freezing process, the build-up of internal pressure depresses the freezing point of the remaining water, allowing the temperature to drop. When the pressure finally breaks the test tube, the decrease in pressure allows the remaining water to freeze at about 0° C., generating a small exotherm. The exotherms are present only when the test tube breaks.

EXAMPLE 14

Standard 12 ounce aluminum cans of the type used for beverages were opened, drained of their contents, rinsed thoroughly, and dried. To ensure that the contents present in the top and bottom of the cans froze first, an insulation wrap was placed around the central portion of the can. The wrap was an aluminum foil bubble wrap, about ¼ inch thick. The wrap was about 4 inches wide so that about ½ inch at the top and the bottom of the can was fully exposed.

Cans were filled with 358–365 grams of the PCM solution prepared in accordance with the protocol of Composition 2 in Example 12 and placed overnight in a deep freezer at −20° to −25° C. The exposed metal allowed the contents in the top and the bottom of the cans to freeze first, followed by the central section. When the frozen liquid was immovable, the freeze process resulted in a burst can. When, however, the frozen mass was movable, the discrete ice particles present within the frozen mass moved relative to one another in order to accommodate the freeze expansion in the central section of the can. The burst frequency results for several aqueous PCMs are summarized below.

BURST FREQUENCY OF ALUMINUM CANS FILLED WITH WATER-ECS CONCENTRATE* SOLUTIONS

| Wt. % ECS Concentrate* | Number of Cans Frozen | Number of Cans Burst | Burst Frequency |
|---|---|---|---|
| 5 | 5 | 0 | 0% |
| 4 | 10 | 0 | 0% |
| 3 | 10 | 3 | 30% |
| 2 | 10 | 4 | 40% |
| 1 | 10 | 10 | 100% |
| 0 | 22 | 20 | 91% |

ECS Concentrate* includes about 80 wt. % Alfonic 1012-5 and 20 wt. % Petro ULF.

At ECS concentrations of 4 wt. %, the burst frequency of the aluminum cans during the freezing process was reduced to zero. At that concentration a sufficient amount of surfactant is present to allow the discrete ice particles to move individually responsive to localized pressure of freeze expansion or movement of adjacent ice particles within the frozen mass. The discrete ice particles were forced into available head space at the top of the can.

The number of different non-ionic and ionic surfactants available is very large. The non-ionic surfactant of the present invention must have a fairly low melting point, not readily form gel solutions with water, and perform satisfactorily through freeze-thaw cycles with water. The anionic surfactant, Petro ULF, was selected for stabilization, i.e. reduction of phase separation, of the non-ionic surfactant at elevated temperatures.

Although the invention has been described in detail with reference to certain preferred embodiments, variations and modifications exist within the scope and spirit of the invention as described and defined in the following claims.

I claim:

1. A thermal energy storage composition for a heat exchanger, said composition comprising
   about 60 to about 96.5 weight percent water,
   about 3 to about 40 weight percent of a water dispersible non-ionic surfactant, and
   an anionic surfactant in an amount sufficient to reduce phase separation of the composition at elevated temperatures,
   said composition capable of freezing to a discontinuous ice phase and significantly maintaining energy storage properties of the water.

2. The composition of claim 1, wherein the anionic surfactant is present in an amount ranging from about 0.3 to about 1.0 weight percent of the composition.

3. The composition of claim 2, wherein the composition remains in a single phase at approximately 90° C.

4. A thermal energy storage composition for a heat exchanger, said composition comprising
   about 60 to about 96.5 weight percent water,
   about 3 to about 40 weight percent of a water dispersible alcohol ethoxylate, and
   an anionic surfactant in an amount sufficient to reduce phase separation of the composition at elevated temperatures,
   said composition capable of freezing to a frozen discontinuous ice phase and significantly maintaining energy storage properties of the water.

5. The composition of claim 4, wherein the alcohol ethoxylate has the formula $R-O-(CH_2CH_2O)_nH$, where R is a linear alkyl radical having from about 8 to about 16 carbon atoms and n is an average from about 5 to about 8.

6. The composition of claim 5, wherein R is a linear alkyl radical having from about 10 to about 12 carbon atoms and n is an average of about 5.

7. The composition of claim 4, wherein the anionic surfactant is present in an amount ranging from about 0.3 to about 1.0 weight percent of the composition.

8. The composition of claim 7, wherein the anionic surfactant is selected from the group consisting of soap and an alkyl naphthalene sulfonate.

9. A frozen thermal energy storage composition for a heat exchanger, said frozen composition comprising
   about 60 to about 96.5 weight percent water, and
   about 3 to about 40 weight percent of a water dispersible non-ionic surfactant,
   said composition being characterized by an ability to significantly maintain energy storage properties of the water and by including discrete ice particles surrounded by a solidified hydrated surfactant phase at about 0° C. to about −1° C., the discrete ice particles being capable of moving individually relative to one another through the solidified surfactant phase in response to localized pressure.

10. The composition of claim 9, further comprising an anionic surfactant.

11. The composition of claim 10, wherein the anionic surfactant is present in an amount ranging from about 0.3 to about 1.0 weight percent of the composition.

12. The composition of claim 10, wherein the composition remains in a single phase at approximately 90° C.

13. A method for reducing rupture failures of a container device during freezing, the container device holding an aqueous phase change material, said method comprising the steps of
   adding to the aqueous phase change material a water-dispersible non-ionic surfactant in an amount sufficient to promote formation of a frozen discontinuous ice phase upon freezing and significantly maintain energy storage properties of the water, and
   adding an anionic surfactant in an amount sufficient to enhance heat stability of the phase change material.

14. The method of claim 13, wherein the non-ionic surfactant comprises an alcohol ethoxylate.

15. The method of claim 14, wherein the anionic surfactant is selected from the group consisting of soap and an alkyl naphthalene sulfonate.

16. The method of claim 13, wherein the amount of the non-anionic surfactant is from about 3 to about 40 weight percent.

17. The method of claim 13, wherein the anionic surfactant is present in the composition in an amount ranging from about 0.3 to about 1 weight percent.

18. A method for reducing rupture failures of a container device during freezing, the container device holding an aqueous phase change material, said method comprising the steps of
   adding to the aqueous phase change material a water-dispersible non-ionic surfactant,
   adding an anionic surfactant in an amount sufficient to enhance heat stability of the phase change material, and
   cooling to composition to a temperature ranging from about 0° C. to about −1° C. to produce a frozen mass having discrete ice particles therein, the ice particles being capable of moving individually relative to one another in response to localized pressure and the frozen mass having the ability to significantly maintain energy storage properties of the water.

19. The method of claim 18, wherein the non-ionic surfactant is present in the composition in an amount ranging from about 3 to about 40 weight percent.

20. The method of claim 19, wherein the non-ionic surfactant comprises an alcohol ethoxylate.

21. The method of claim 18, wherein the anionic surfactant is present in the composition in an amount ranging from about 0.3 to about 1 weight percent.

* * * * *